Jan. 6, 1942.　　　J. YOUNG　　　2,268,687
ELECTRICALLY ACTUATED IMPLEMENT
Filed June 2, 1939　　　2 Sheets-Sheet 1
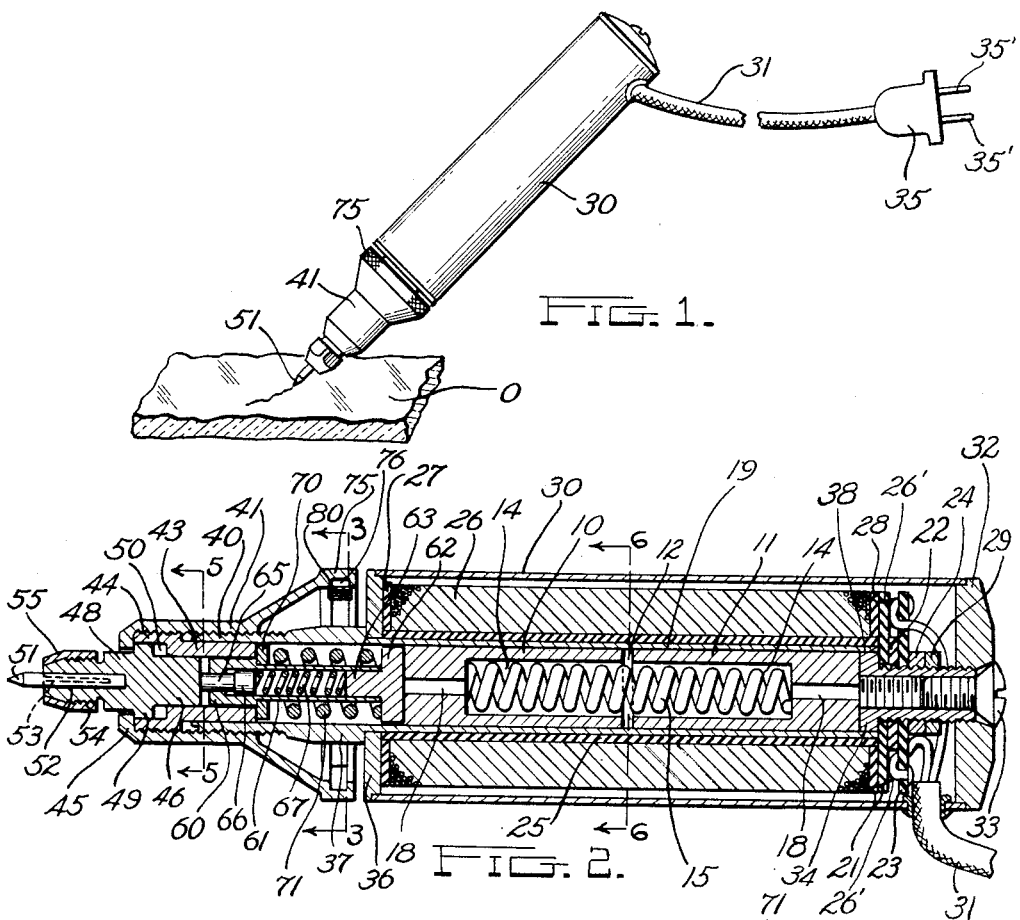
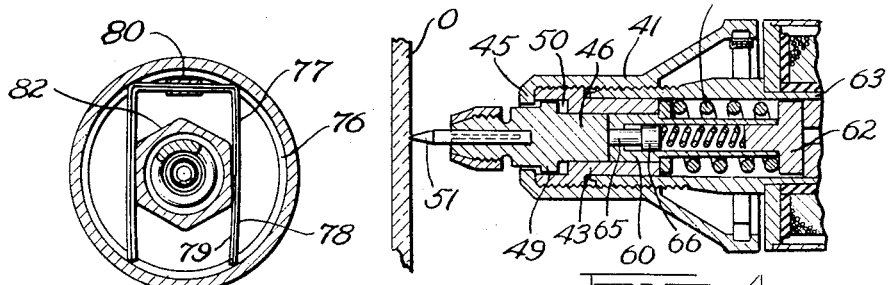
Inventor
John Young
By Braselton, Whitcomb & Davies
Attorney Jan. 6, 1942.  J. YOUNG  2,268,687

ELECTRICALLY ACTUATED IMPLEMENT

Filed June 2, 1939  2 Sheets-Sheet 2

Inventor
John Young

By Braselton, Whitcomb & Davies
Attorney

Patented Jan. 6, 1942

2,268,687

UNITED STATES PATENT OFFICE 2,268,687

ELECTRICALLY ACTUATED IMPLEMENT

John Young, Toledo, Ohio

Application June 2, 1939, Serial No. 277,110

8 Claims. (Cl. 172—126)

This invention relates to electrically actuated implements and more especially to an apparatus particularly adaptable for performing work upon solid or semi-solid objects.

The invention embraces a means energized by an alternating or variable electric current for performing various types of work upon objects both metallic or non-metallic, including glazed surfaces, and comprehends such work as etching, engraving, marking, cutting, chiseling, severing, or driving, or other similar operations upon such objects by the utilization of combined electrical and mechanical means.

The invention has for one of its objects an improved tool or implement of this character in which the alternations of the current or changes in the intensity of electrical energy supplies movement for operating the tool.

A further object of the invention is the provision of a reciprocable electrically actuated implement of such character that it may be used to perform work upon non-current-conducting objects and which is capable of imparting rapid impacts to the objects caused primarily by alternations or changes of the electrical energy employed to actuate the implement.

A further object of the invention is the provision of a device of this character wherein the useful stroke or amplitude of the tool movement may be readily and quickly adjusted without modifying or changing the rapidity or period of the reciprocating cycles.

Still a further object of the invention resides in the provision of an electrically actuated implement wherein the prime mover is so arranged with respect to the tool holder or carrier that the prime mover may reciprocate without appreciably affecting movement of the tool bit or its holder until the operator brings the tool bit into contact with the object upon which work is to be performed.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 1 is an elevational view showing a form of electrically actuated implement of my invention;

Figure 2 is a longitudinal sectional view showing the arrangement of elements of the implement;

Figure 3 is a transverse sectional view taken substantially on the line 3—3 of Figure 2;

Figure 4 is a fragmentary sectional view of a portion of the apparatus shown in Figure 2 in adjusted position;

Figure 7:
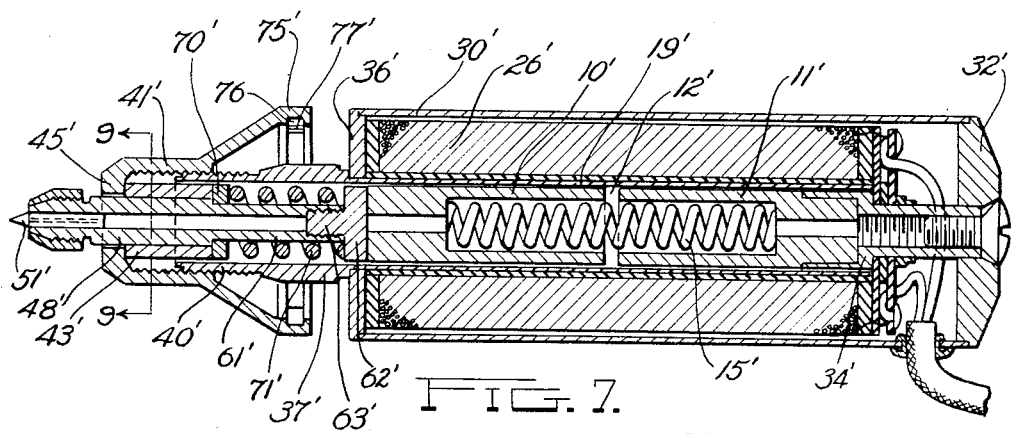
Figure 7 is a view similar to Figure 2 showing a modified form of the invention.
Figure 5:
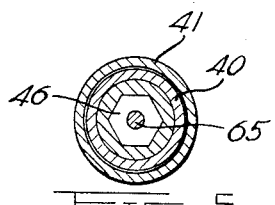
Figure 5 is a transverse sectional view taken substantially on the line 5—5 of Figure 2.

Referring to the drawings in detail, the arrangement of my invention is inclusive of a solenoid core structure comprising two cylindrically shaped elements designated 10 and 11 of magnetizable material preferably fabricated of soft ferrous metal to enhance their magnetic properties, the core sections being preferably arranged in axial alignment and normally separated by a space or air gap 12. The core sections are bored as at 14 throughout a portion of their length and in such aligned bores is positioned a resilient member or coil spring 15 of substantially nonmagnetic material as, for example, bronze or the like, which spring normally tends to separate the core sections 10 and 11. Each core section is preferably bored throughout the remainder of its length as at 18 with a bore of reduced size and the walls of the core sections are preferably slotted longitudinally as at 16 for the purpose of minimizing the formation of eddy currents in the core structure without causing a longitudinal subdivision of core sections.

The core sections 10 and 11 are slidably retained within a sleeve 19 formed of brass or other non-magnetic material which is preferably slotted longitudinally as at 20 to reduce the formation therein of eddy or induced currents and thereby minimize heating. Surrounding the sleeve 19 is the insulating sleeve 25 which supports magnetizable windings or energizing coil 26 comprising a plurality of convolutions of insulated wire located between the insulating disks 27 and 28. Adjacent to disk 28 are located a pair of washers of insulating material 21 and 23 provided with openings to anchor the extremities of the windings or coil terminals 26', the latter being connected to suitable current conducting leads insulatingly carried by a cable 31 passing through an opening in the side wall of the casing 30. The cable 31 terminates in a connecting plug 35 having current connecting prongs 35' which are adapted to be connected to a source of commercial alternating current supply or to a variable or oscillatory current source in the conventional manner. The insulating disks 21 and 23 which serve to hold in proper spaced relationship and protect the lead wires or terminals of the coil 26 from stresses transmitted through cable 31, are separated by means of a disk 22 and the several disks are held together by means of lock nuts 24 and 29 threaded upon the outer surface of the reduced end hollow portion of an extension 34 of ferrous metal which is brazed or fused to the sleeve 19 as at 38, the extension 34 also being split by prolongation of the slot 20 in sleeve 19.

The casing 30 is closed at its outer end by a metallic disk or steel closure 32 which is held in place by a screw 33 threaded into the hollow extension 34, the screw serving to removably secure the disk 32 urging the same into contact with the end walls of the tubular casing 30. The other end of the casing is closed by means of a metal disk 36 having a central opening which accommodates the sleeve 19 abutting against an enlarged shoulder 37 formed on the sleeve 19 and thereby through the action of screw 33 the shoulder 37 retains the disk 36 in contact with the other end of casing 30. In the arrangement illustrated, it is preferable that the disks 32 and 36 and the casing 30 be fabricated of magnetizable or ferrous metal in order to provide a more complete path for the lines of magnetic force generated by current passing through the coil 26, which magnetic force acts upon the core sections 10 and 11.

The forward extremity 40 of sleeve 19 is threaded to receive a member 41 and positioned in member 41 is a sleeve or bushing 43 which is in threaded engagement as at 44 with member 41, the member 41 having at one end an inwardly extending annular flange 45 serving to position the sleeve 43 with respect to member 41.

The sleeve 43 is provided with a bore to slidably receive the tenon portion 46 of a tool holder 48, the latter being formed with a shoulder 49 which is accommodated in an enlarged bore 50 in the member 43, the flange 45 of member 41 serving to limit the outward movement of tool holder 48. The end of the tool holder 48 is centrally bored to receive a tool or tool bit 52 and is provided with transverse slots 53 and a threaded portion 54 to threadedly receive a tool locking collet 55 which is tapered to cause the sections of the tool holder separated by the slots 53 to be drawn down into gripping engagement with the tool when the collet 55 is drawn up upon portion 54 of the tool holder.

Slidably positioned in the bore in inner sleeve 43 is a striker member 60 having a tubular portion or extension 61, upon the extremity of which is secured an anvil 62 having a tenon portion 63 which projects into and closes the end of the tubular extension 61 and is secured thereto by means of welding or the like. The striker member 60 is centrally bored at its forward end to receive a reciprocable plunger 65 having an enlarged portion 66 slidable in the tubular portion 61 of member 60, there being also a coil spring or resilient member 67 positioned in the tubular portion 61, one end of the spring 67 contacting the extremity of tenon 63 formed on the anvil 62 and the other end contacting with the enlarged portion 66 of plunger 65, the plunger and spring being inserted into the tubular portion 61 before the anvil 62 is affixed to the striker member 60.

Slidably positioned upon the exterior of the tubular extension 61 is a washer or disk 70 and positioned between the anvil 62 and disk 70 is a resilient member or balance spring 71. I have found that the length of the balance spring is an important factor in the proper operation of the arrangement of my invention and with the tool holder and associated elements in the position illustrated in Figure 2, the balance spring is of a length to be placed under very slight tension between the disk 70 and the anvil 62, and because of such slight tension and the contact between anvil 62 and the relatively movable core section 10, spring 15 is placed under slight compressive tension.

The implement of my invention embodies means for varying the length of the stroke of the relatively movable core section and therefore its impingement pressure upon the tool holder and consequently the tool so that such stroke may be changed or regulated, but the periodicity of the reciprocations of the core section 10 remains in constant synchronism or phase with the frequency of the alternating current. To this end the member 41 is provided with an enlarged conically shaped portion 75 which is provided with an internal circumferential groove 76 adapted to receive a U-shaped or hairpin-like spring 77 as especially illustrated in Figure 3, the spring being preferably fabricated of a plurality of juxtaposed sections 78 and 79 to enhance the flexibility of the spring action. The sections 78 and 79 of the spring are preferably held together by means of a small sleeve 80. It is to be noted that the apex and end portions of the spring are confined in the groove 76 as particularly illustrated in Figure 3 and that the opposing leg portions of the spring contact the facets 82 of the polygonal or non-circular portion 37 of the sleeve 19. Thus, the operator of the implement may manually rotate member 41 with respect to the casing 30 and due to the resiliency of the spring 77 member 41 may be adjusted so as to move the sleeve 43 and the tool holder 48 relative to the core section 10 and anvil 62 to regulate the length of stroke of the relatively movable core section 10 as the movement of sleeve 43 toward the casing compresses the balance spring 71 consequently compressing the spring 15 and bringing the core sections 10 and 11 closer together to decrease the gap 12 therebetween. Thus, as the gap 12 is decreased in size by adjustment of member 41 the springs 15 and 71 are placed under additional or increased compressive stress, the stroke or reciprocatory movement of the core section 10 is correspondingly decreased. The resiliency of the leg portions of spring 77 engaging with the polygonal portion 37 of sleeve 19 causes the parts to remain in their adjusted position.

The exterior periphery of tenon 46 of the tool holder is of polygonal or non-circular configuration to fit a correspondingly polygonal or non-circular configuration of the central opening through the sleeve 43 so that when the tool is in use the tool holder will not rotate relative to the casing 30 and member 41.

Figure 6:
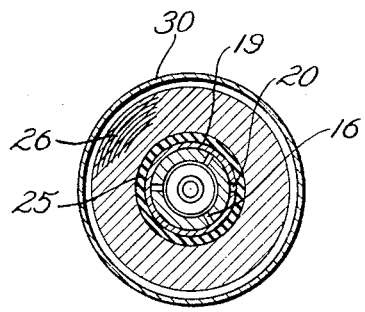
Figure 6 is a transverse sectional view taken substantially on the line 6—6 of Figure 2.

It is also to be noted in Figure 6 that the core sections 10 and 11 are slotted as at 16 to minimize the formation of eddy currents in the core structure.

The operation of the structure above described is as follows: When it is desired to perform work with the implement of my invention, the attachment plug 35 is connected to a source of alternating current as, for example, a current of 110 volts having a frequency of sixty cycles per second, although currents of other voltage and frequency may be used. When the current cycle is at its peak, the relatively movable core section 10 is drawn toward the stationary core section 11 further compressing the spring 15. Such movement temporarily relieves spring 71 of most or all of its compressive stress and core section 10 may move away from the anvil 62. As the current decreases from its peak to zero value, the "magnetic pull" of core section 11 upon core section 10 is reduced substantially to zero and the stored energy of compression in the spring 15 imparts to core section 10 a strong force impinging the core section upon the anvil 62 thus exerting force through tubular member 61 to the striker member 60. It is to be noted that with the tool holder normally in position shown in Figure 2 at its outermost position with the flange 49 in engagement with the flange 45 of member 41, the striker member 60 will be reciprocated by the movement of core section 10 but does not impinge upon the end of the tool holder 46. This movement of the core section is transmitted to spring member 67 and plunger 65 which are caused to vibrate but no movement is transmitted to the tool holder. When, however, the tool 51 carried by the tool holder 46 is pressed upon the object O, upon which work is to be performed, thus moving the shoulder 49 of the tool holder away from engagement with the internal wall of flange 45 of member 41 as shown in Figure 4, this position of the tool holder closes up the gap between the striker member 60 and the striking face of the tool holder so that the reciprocatory movement of the core section 10 is then transmitted to the tool holder through the striker member thence to tool 51 and the object O. As illustrated in Figure 4, as long as the shoulder 49 of the tool holder 46 "floats" in the space 50 in the sleeve 43 the reciprocatory movements of core section 10 in the direction of the tool holder causes an impingement of force upon the tool holder through the striking member 60 at each alternation of the electric current passing through coil 26 and thus provides a continuous rapid hammering action of the tool 51 upon the work or object O, the number of impulses per second being equal to the frequency of the current alternations. Thus, in this form of the invention, it is necessary that the operator press the tool 51 against the work to cause the tool holder to be retracted into the path of the striker member 60 in order to impart a driving force to the tool. Otherwise, if the tool 51 is removed from pressure contact with the object O, tool holder 46 is immediately moved under the influence of plunger 65 and spring 67 until its shoulder portion 49 contacts with flange 45 and further reciprocatory movement is imparted only to striker member 60 as long as the current supply is connected by the striker member and does not contact the tool holder 46 so that no movement of the latter takes place.

In the event that it is desired to shorten or decrease the effective force or stroke of core section 10, the member 41 may be threaded toward the casing 30 carrying with it the inner sleeve 43 which acts upon the washer or disk 70 to further compress balance spring 71. With this increase in compressive stress of the balance spring 71, the compressive stress is correspondingly increased upon spring 15 and the effect is to further decrease the air gap 12 between the core sections 10 and 11 and thus decrease the amplitude or effective distance through which the core section 10 moves under the influence of the alternating current and consequently decreases the stroke of the core section with a consequent decrease in the force applied upon the tool holder and the tool 51. By this manner, the effective driving force acting upon the tool holder may be regulated to provide various lengths of stroke of core section 10 with a consequent regulation of the amount of impinging force imparted to the tool 51, but the reciprocating frequency or the periodicity of vibration of the core section remains in constant synchronism with the phase of the electric current.

Thus, it will be seen that whenever the tool 51 is lifted from the work or object O that no vibration of the tool or tool holder takes place.

Figure 8:
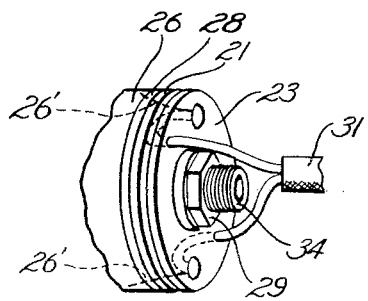
Figure 8 is a fragmentary isometric view showing the arrangement of electrical connections to the energizing coil.
Figure 9:
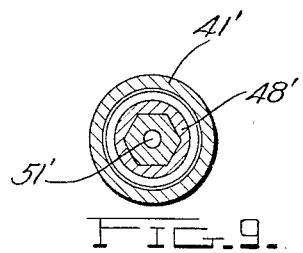
Figure 9 is a transverse sectional view taken substantially on the line 9—9 of Figure 7.

In Figures 7 to 9 I have illustrated a modified form of the invention wherein there is a general similarity in construction with the arrangement of the invention as disclosed in Figure 2, but the action and operation of the structure is modified. This form of the invention is inclusive of the relatively movable and stationary core sections 10' and 11' normally separated by gap 12', the core sections being centrally bored out to accommodate a spring 15'. The core sections are mounted with in a sleeve or tube 19' which is in turn surrounded by an energizing coil 26' positioned within a casing 30', there being closure plates 32' and 36', the casing and closure plates and a bushing 34' being of ferrous metal to form with the core sections a substantially completed magnetic path. The coil structure and casing structures are substantially of the same form as hereinbefore described in connection with the arrangement illustrated in Figure 2.

The sleeve 19' has an enlarged portion 37' which projects exteriorly of the casing 30' and is of polygonal exterior configuration, in the embodiment illustrated this configuration being hexagonal, which is resiliently contacted by a spring 77' carried in a groove 76' in the enlarged portion 75' of member 41'. The sleeve 19' is also formed with an exteriorly threaded extension 40' and the interior wall of member 41' is correspondingly threaded and is thus mounted upon the portion 40', the member 41' being movable longitudinally of the projecting portion 40' by rotation of member 41'. Slidably mounted within the interior of projecting portion 40' is a sleeve 43' which abuts at its outer end the flange 45' of member 41'. Slidably positioned within the sleeve 43' is a tool holder 48', the exterior surface of the tool holder 48' and the interior walls of the sleeve 43' and flange 45' are of non-circular configuration, as illustrated in Figure 9, so that the tool 51' carried by the tool holder 48' does not rotate with respect to member 41' so that the tool does not rotate with respect to the casing when the tool is in operation. The tool holder 48' has a reduced tenon or extension 61' which carries at its upper extremity the anvil 62', the latter being provided with a tenon 63' which is threaded into or otherwise secured to portion 61' of the tool holder 48'.

Slidably mounted upon the portion 61' of the tool holder is the washer or disk 70' and interposed between the anvil 62' and disk 70' is a balance spring 71'.

The operation of this form of the invention is as follows: The energization of coil 26' by connecting the same to a source of alternating current causes core section 10' to be momentarily drawn toward core section 11', decreasing air gap 12', compressing spring 15', thus storing up potential energy in the spring which, when the current phase reaches a zero value, causes the magnetic attraction between core sections 10' and 11' to be substantially decreased to a zero value and allowing the expansive force of spring 15' to drive core section 10' against the anvil 62' thus imparting a driving force directly upon the tool holder 48' and tool 51'. In the operation of this form of the invention, whenever the coil 26' is energized the repeated reciprocatory or hammering action of the relatively movable core section 10' is imparted to the tool holder 48' so that it is unnecessary that a predetermined amount of pressure be exerted by tool 51' against the object upon which work is to be performed. In this form of the invention as in the form shown in Figure 2, however, the magnitude and length of the stroke or reciprocatory movement of core section 10' may be regulated by rotating member 41' relative to sleeve 19' upon threaded portion 40' thereof which moves member 41' longitudinally and when threaded so as to move member 41' toward the casing as viewed in Figure 7, the flange 45' and sleeve 43' bear against the disk 70' and increase the compressive stress on the balance spring 71' and hence increase the stress of spring 15'. Thus, with increased compression on the balance spring 71' and the spring 15', the movements of core section 10' are thereby decreased and thus the effective driving pressure upon the anvil 62' and tool holder 48' is correspondingly decreased. In this manner, by regulating the position of the member 41' with respect to the casing 30', a very infinitely small reciprocatory movement of tool 51' may be had, or the movement of the tool may be increased and a corresponding increase in driving force of core section 10' had by threading member 41' away from the casing 30'. The limit of movement in attaining the effective driving force upon tool 51' is an adjustment of head 41' to that position where the balance spring 71' is out of range of effective movement of the anvil 62' as the balance spring 71' must be under a compressive stress in order to retract the core section 10' away from the tool holder, otherwise, there would be no effective driving force acting upon the tool holder.

It is apparent that within the scope of the invention, modifications and different arrangements may be made other than is herein disclosed, and the present disclosure is illustrative merely, the invention comprehending all variations thereof.

What I claim is:

1. In an electrically actuated tool, the combination of a casing; relatively stationary and movable core sections in said casing; a spring interposed between said core sections for normally separating the same; a coil for energizing said core sections; a sleeve surrounding said core sections and having a threaded projecting portion; a member threadedly supported upon said sleeve; a second sleeve positioned within the projecting portion of said first mentioned sleeve and adapted to be moved by the threadedly supported member; a tool holder slidably mounted within said second mentioned sleeve; an anvil slidably positioned adjacent said second mentioned sleeve; and a spring interposed between the second mentioned sleeve and said anvil.

2. In an electrically actuated tool, the combination of relatively stationary and movable magnetizable core sections in axial alignment each provided with a recess; a spring located within said recesses interposed between said core sections for normally separating the same; a coil for periodically attracting said core sections together, thereby compressing said spring and storing potential energy therein; a sleeve associated with said core sections and having a threaded portion; a reciprocatory movable tool holder located in said sleeve; an anvil slidably positioned in said sleeve adapted to receive the impact caused by the energy stored in said spring and transfer the impact to the tool holder; a second spring urging said anvil in contact with said relatively movable core section; and a member threadedly supported upon said sleeve having means coacting with the second mentioned spring for adjusting the tool holder with respect to the movable core section.

3. In an electrically actuated tool, the combination of a casing; relatively stationary and movable core sections in said casing; a spring interposed between said core sections for normally separating the same; a coil for energizing said core sections; a sleeve surrounding said core sections and having a threaded projecting portion; a member threadedly supported upon said sleeve; a second sleeve positioned within the projecting portion of said first mentioned sleeve; a tool holder slidably mounted in said second mentioned sleeve; an anvil slidably positioned in said second mentioned sleeve; a spring interposed between said second sleeve and said anvil; said first mentioned sleeve having a polygonal peripheral portion; and flexible means carried by the adjustable member and engageable with the polygonal periphery of said sleeve for adjusting the tool holder with respect to the anvil.

4. In an electrically actuated tool, the combination of a casing; a relatively stationary core section; a movable core section; a spring interposed between said core sections for normally separating the same; a coil for energizing said core sections; a sleeve surrounding said core sections and spring; a member movably supported upon said sleeve carrying a projecting flange located within said sleeve; a tool holder slidably mounted within said flange; an anvil member positioned between said tool holder and said core section; a spring interposed between said projecting flange and said anvil member for urging the latter in engagement with said movable core section whereby movement imparted to said flange by said movable member changes the tension of both of said springs.

5. A device of the class described, in combination, a supporting structure; a magnetizable core having relatively stationary and movable sections carried by said supporting structure; a spring interposed between said core sections for normally separating the same; a current conducting coil surrounding said magnetizable core intermittently energized for attracting said core sections together thereby compressing said spring storing potential energy therein; a reciprocatory tool holder adjacent said movable core carried by said supporting structure; a sleeve carried by said supporting structure surrounding said tool holder; an anvil interposed between said tool holder and movable core; a coil spring contacting with said sleeve and anvil for opposing movement of said movable core section toward said tool holder when the potential energy stored in said first mentioned spring is released; a slidably mounted plunger in engagement with said tool holder; and a third spring means interposed between said plunger and said anvil.

6. A device of the class described, in combination, a casing; a periodically energized current conducting coil positioned within said casing; a magnetizable core including relatively stationary and movable sections periodically urged together by the energization of said coil; a recess in said core sections; a spring positioned within said recess for normally separating said movable and stationary core sections, said spring adapted to store energy when said sections are urged together by the magnetizing action of said coil; a sleeve surrounding said core sections and having a projecting portion; a tool holding means slidably mounted adjacent the projecting portion of said sleeve adapted to receive through the movement of the movable core the energy stored in said spring; a second spring positioned within said sleeve adjacent to said tool holding means for opposing the separation of the relatively movable core section from the stationary core section; and a resiliently mounted plunger interacting with said movable core section and said tool holding means and being in contact with the latter.

7. In an electrically actuated tool, the combination of a casing; relatively stationary and movable magnetizable core sections in said casing provided with axially aligned recesses; a spring of non-magnetic material interposed between said core sections and being positioned within said aligned recesses for normally separating the same; a coil alternatingly energized for magnetizing said core sections thereby periodically compressing said spring and storing potential energy therein; an anvil; a tool holder actuated by energy stored in said spring acting on the anvil through said movable core section; a second spring urging said anvil into engagement with the relatively movable core section; and means for changing the initial position of said tool holder relative to said casing.

8. A device of the class described, in combination, a casing; movable core slidably located within said casing having a hollow section; a spring located within said hollow core section for normally holding said core in one position; a current conducting coil alternatingly energized for periodically compressing and thereby storing potential energy in said spring; a tool holder carried by said casing; an anvil; a secondary spring contacting with said anvil for urging the anvil into engagement with the movable core to follow the latter when the same is moved to compress said first mentioned spring whereby when movement is imparted to the movable core by the energy stored in said first spring the same is transmitted through the anvil to the tool holder; and manually operable means coacting with said tool holder and secondary spring for changing the initial tension of the latter and the position of the tool holder with respect to the casing for varying the impact of said movable core upon said tool holder.

JOHN YOUNG.